(12) United States Patent
Johnson et al.

(10) Patent No.: US 8,321,188 B2
(45) Date of Patent: Nov. 27, 2012

(54) WEATHER-RELATED ENERGY-USAGE ANALYSIS

(75) Inventors: Derek Mallough Johnson, Matthews, NC (US); Antonio Deese, Charlotte, NC (US); Nickolas Gerhard Friedrich, Charlotte, NC (US); Andrew Pickens Rutherford, Charlotte, NC (US); Brian John Walser, Charlotte, NC (US); Russell Dean Warner, Indian Trail, NC (US); Dan Yang, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 274 days.

(21) Appl. No.: 12/621,265

(22) Filed: Nov. 18, 2009

(65) Prior Publication Data
US 2011/0119042 A1    May 19, 2011

(51) Int. Cl.
*G06G 7/48*    (2006.01)

(52) U.S. Cl. .......................................................... 703/6

(58) Field of Classification Search ....................... 703/6
See application file for complete search history.

(56) References Cited

U.S. PATENT DOCUMENTS 4,215,408 A * 7/1980 Games et al. ................. 700/278
6,968,295 B1 * 11/2005 Carr .............................. 702/188

OTHER PUBLICATIONS

U.S. Appl. No. 12/617,217, filed Nov. 12, 2009, Johnson et al.
U.S. Appl. No. 12/617,220, filed Nov. 12, 2009, Johnson et al.
U.S. Appl. No. 12/617,224, filed Nov. 12, 2009, Johnson et al.
U.S. Appl. No. 12/617,228, filed Nov. 12, 2009, Johnson et al.

* cited by examiner

*Primary Examiner* — Saif Alhija
(74) *Attorney, Agent, or Firm* — Michael A. Springs; Moore & Van Allen PLLC; Padowithz Alce

(57) ABSTRACT

Embodiments of the invention relate to apparatuses and methods for gathering and analyzing facility weather data, such as temperature and humidity data, and energy-usage data, such as electricity-usage data, from a plurality of remote facilities and using the analysis to assess energy-using systems and/or methods across an organization made up of the plurality of remote facilities.

38 Claims, 10 Drawing Sheets

```
┌─────────────────────────────────────────┐
│   WEATHER MONITORING SYSTEM             │
│              400                        │
│                                         │
│   ┌─────────────────────────────────┐   │
│   │ EXTERIOR TEMPERATURE SENSOR(S)  │   │
│   │ WITH LAN COMMUNICATION INTERFACE│   │
│   │              410                │   │
│   └─────────────────────────────────┘   │
│                                         │
│   ┌─────────────────────────────────┐   │
│   │ EXTERIOR HUMIDITY SENSOR(S) WITH│   │
│   │ LAN COMMUNICATION INTERFACE     │   │
│   │              420                │   │
│   └─────────────────────────────────┘   │
│                                         │
│   ┌─────────────────────────────────┐   │
│   │ OTHER WEATHER SENSING DEVICES   │   │
│   │ WITH LAN COMMUNICATION          │   │
│   │ CAPABILITIES                    │   │
│   │              430                │   │
│   └─────────────────────────────────┘   │
└─────────────────────────────────────────┘
```

*FIG. 4*

WEATHER-RELATED ENERGY-USAGE ANALYSIS

FIELD

Embodiments of the invention relate generally to the field of energy and/or facility management systems, and, more particularly, embodiments of the invention relate to apparatuses and methods for gathering and analyzing weather data and energy-usage data across a plurality of remote facilities and using the analysis to assess energy-using systems and/or methods used at or proposed for one or more of the facilities.

BACKGROUND

Large organizations having multiple facilities around the world can use a lot of energy to power each facility and each facility's systems, including but not limited to electricity used for electrical outlets, lighting, heating, and/or cooling. With energy costs on the rise and the desire to reduce energy consumption for environmental reasons, organizations are increasingly trying to find ways to cut energy usage. There is the potential for significant savings if a large organization can reduce, even slightly, the amount of energy it uses for electricity through electrical outlets, lighting, heating, and/or cooling in the organization's offices, stores, warehouses, and other remote facilities. This may be especially true in the case of organizations that have thousands, if not tens of thousands, of remote facilities spread out across the world in different climates. As such, there is a need to develop apparatuses and methods to efficiently monitor and manage energy-using systems across a plurality of remote facilities in various climates and to manage those utilities in a way that tries to minimize the amount of energy used at the various facilities, while still providing suitable environments for the organization's employees and customers.

Furthermore, as energy conservation systems and methods are developed to reduce the organization's energy usage, the organization needs a way to assess such conservation systems and methods before installing them at a facility to determine if they will, in fact, reduce energy consumption, and to determine if they will be cost effective. This can be difficult for an organization having facilities all over the world because the climate at each facility can vary greatly from one facility to the next, and climate can have a significant impact on energy usage. After implementation of an energy conservation system or method at a particular facility, the organization may also desire to determine the effects of the energy conservation system or method to determine whether the system or method has been successful.

BRIEF SUMMARY

Embodiments of the present invention provide systems and methods that can be used by an organization to more easily assess an energy conservation program and/or a proposed energy conservation program. In this regard, embodiments of the present invention model and analyze energy-usage data for each of the organization's remote facilities in relation to each facility's weather data. For example, in one embodiment of the invention, a central monitoring and control system gathers daily temperature, humidity, and energy-usage data from each of a plurality of remote facilities. The central monitoring and control system then calculates daily enthalpy values for the facility based on the temperature and humidity data. The central monitoring and control system then removes outlier data and generates (using, for example, linear regression techniques and a minimum R-squared value) a suitable model of daily energy usage at the facility as a function of the facility's daily enthalpy. This model is then used to assess energy-usage-altering systems and methods for the facility and for the organization generally.

For example, embodiments of the invention include an apparatus having: (1) a memory including enthalpy data and energy usage data stored therein, where the enthalpy data includes data about a facility's enthalpy during each of a plurality of time periods, and where the energy-usage data includes data about the facility's energy usage during each of the plurality of time periods; and (2) a processor operatively coupled to the memory and configured to use the enthalpy data and the energy-usage data to generate a model of the facility's energy usage as a function of enthalpy.

In some embodiments, the apparatus further includes a communication interface configured to receive temperature data and humidity data, where the temperature data includes information about the facility's outside air temperature during each of the plurality of time periods, where the humidity data includes information about the facility's outside air relative humidity during each of the plurality of time periods, and where the processor is further configured to determine the enthalpy data based on the temperature data and humidity data. In some such embodiments, the communication interface is configured to receive the temperature data and humidity data from one or more sensors located at the facility.

In some embodiments, the apparatus includes a communication interface configured to receive the energy-usage data from one or more utility bills for the facility. In some embodiments, the apparatus includes a communication interface configured to receive the energy-usage data from one or more electricity sensors or meters located at the facility.

In some embodiments of the apparatus, the processor is configured to identify and remove outlier enthalpy data or outlier energy-usage data prior to generating the model of the facility's energy usage. In some such embodiments, the processor is configured to replace the outlier enthalpy data or outlier energy-usage data with estimated data based on non-outlier enthalpy or energy-usage data.

In some embodiments of the apparatus, the memory includes one or more rules stored therein, and the processor is configured to: (1) generate a model equation of energy-usage at the facility as a function of enthalpy of outside air at the facility, and (2) determine if the model equation satisfies the one or more rules stored in the memory. In some such embodiments, the one or more rules includes a minimum R-squared value, and, in some embodiments, the processor is configured to calculate an actual R-squared of the model equation and compare the actual R-squared value to the minimum R-squared value. In some embodiments, the processor is configured to generate a higher order model equation if it determines that the model equation does not satisfy the one or more rules stored in the memory. In some embodiments, the processor is configured to use less enthalpy data and energy-usage data to generate the model equation if it determines that the model equation does not satisfy the one or more rules stored in the memory.

In some embodiments of the apparatus, the plurality of time periods is a plurality of days, and the enthalpy data includes the average enthalpy of the facility's outside air per day, and the energy-usage data includes energy-usage per day.

In some embodiments of the apparatus, the processor is further configured to use the model to assess an energy-usage-altering program or a proposed energy-usage-altering program at the facility. In some embodiments, the processor is configured to display a comparison of facility energy-usage data after an energy-usage-altering program is implemented at the facility with data generated from the model.

Embodiments of the present invention also include a method involving: (1) gathering, using a computer, enthalpy data and energy-usage data, wherein the enthalpy data comprises data about a facility's enthalpy during each of a plurality of time periods, and wherein the energy-usage data comprises data about the facility's energy usage during each of the plurality of time periods; and (2) using the enthalpy data and the energy-usage data to generate, using a computer, a model of the facility's energy usage as a function of enthalpy.

Embodiments of the present invention also include a computer program product having computer-readable storage medium. The computer-readable medium includes computer-executable program code stored therein. The computer-executable program code includes: (1) a first executable portion configured to obtain enthalpy data and energy-usage data, wherein the enthalpy data comprises data about a facility's enthalpy during each of a plurality of time periods, and wherein the energy-usage data comprises data about the facility's energy usage during each of the plurality of time periods; and (2) a second executable portion configured to use the enthalpy data and the energy-usage data to generate a model of the facility's energy usage as a function of enthalpy.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
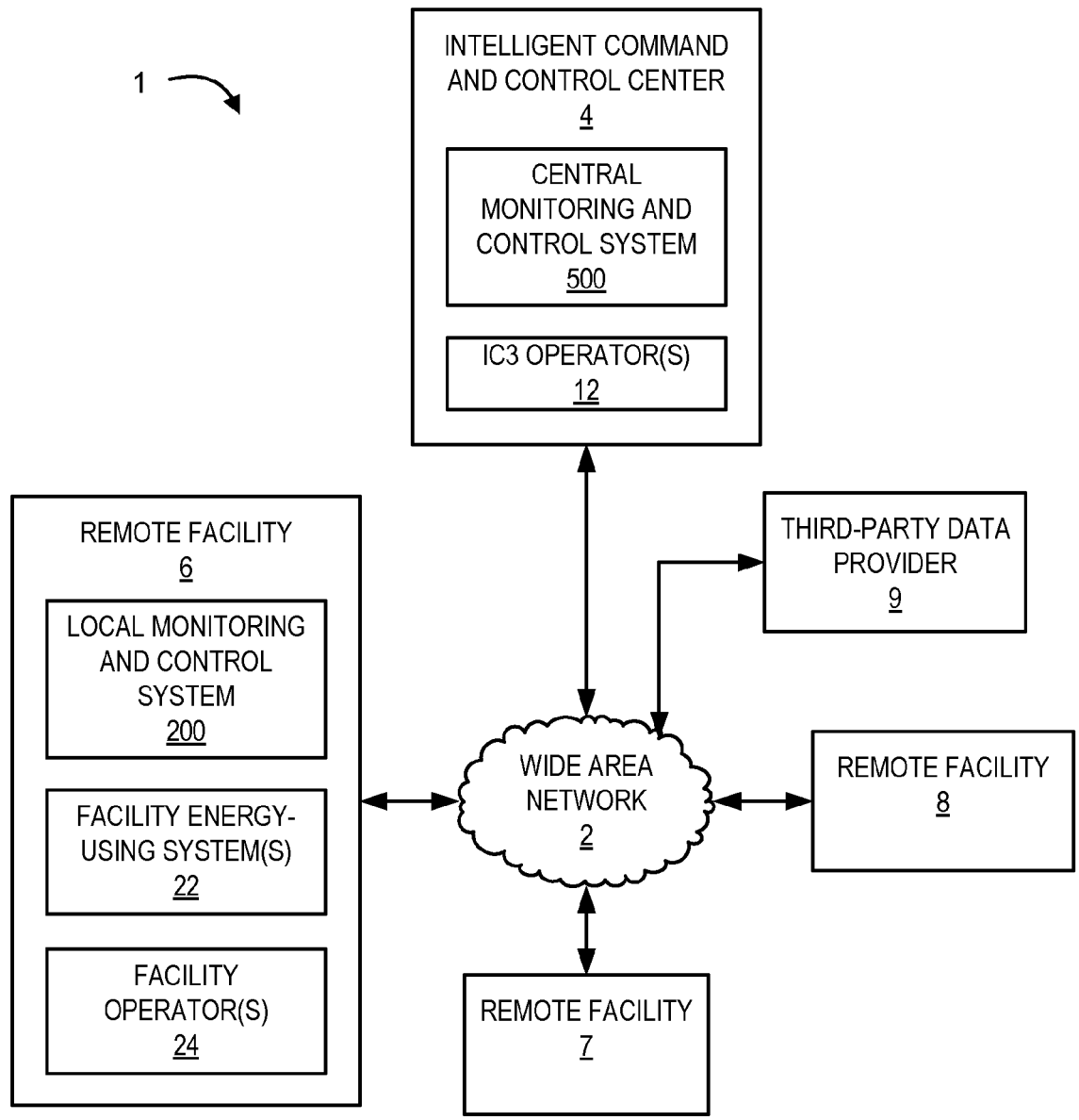
Figure 2:
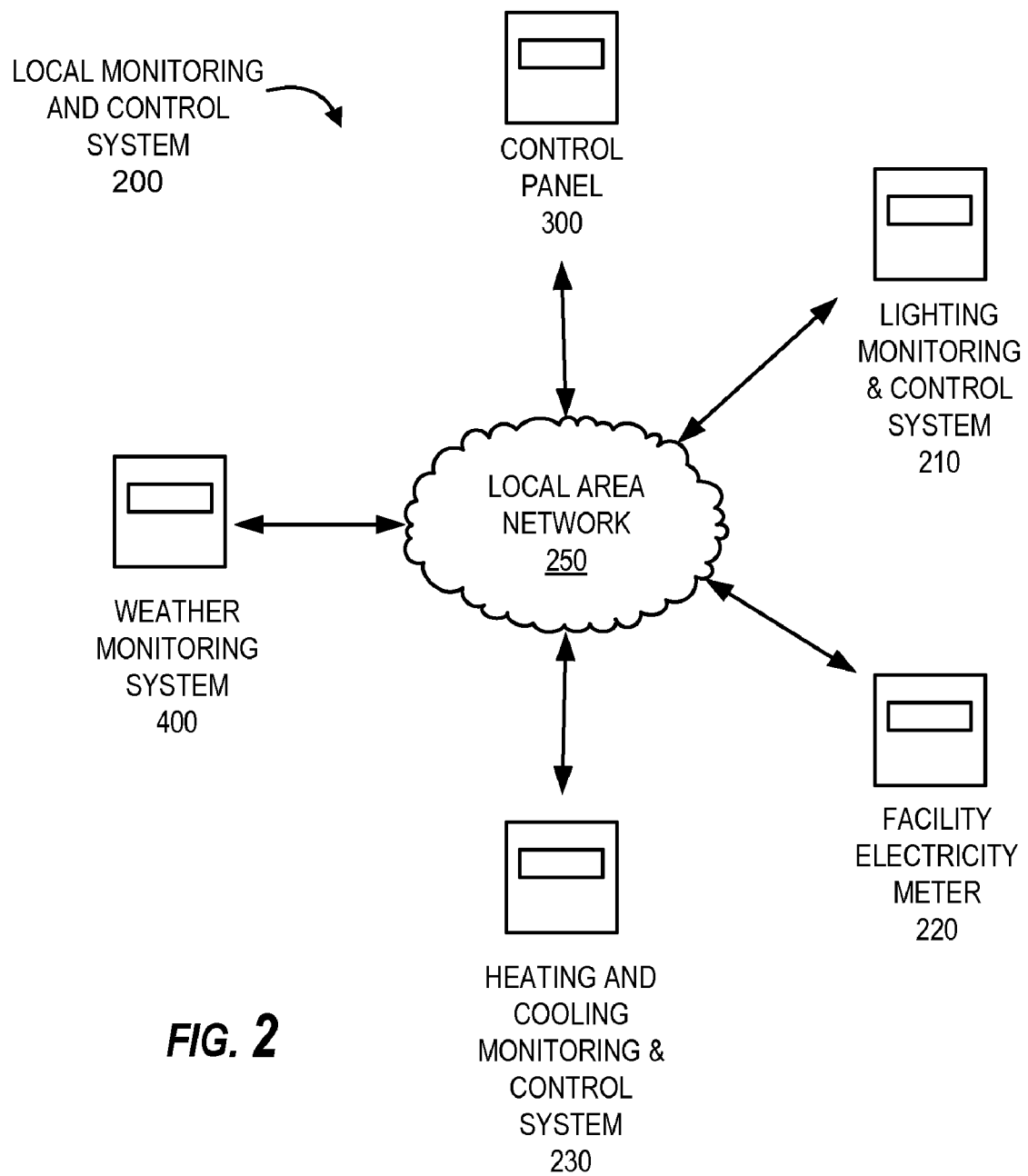
Figure 3:
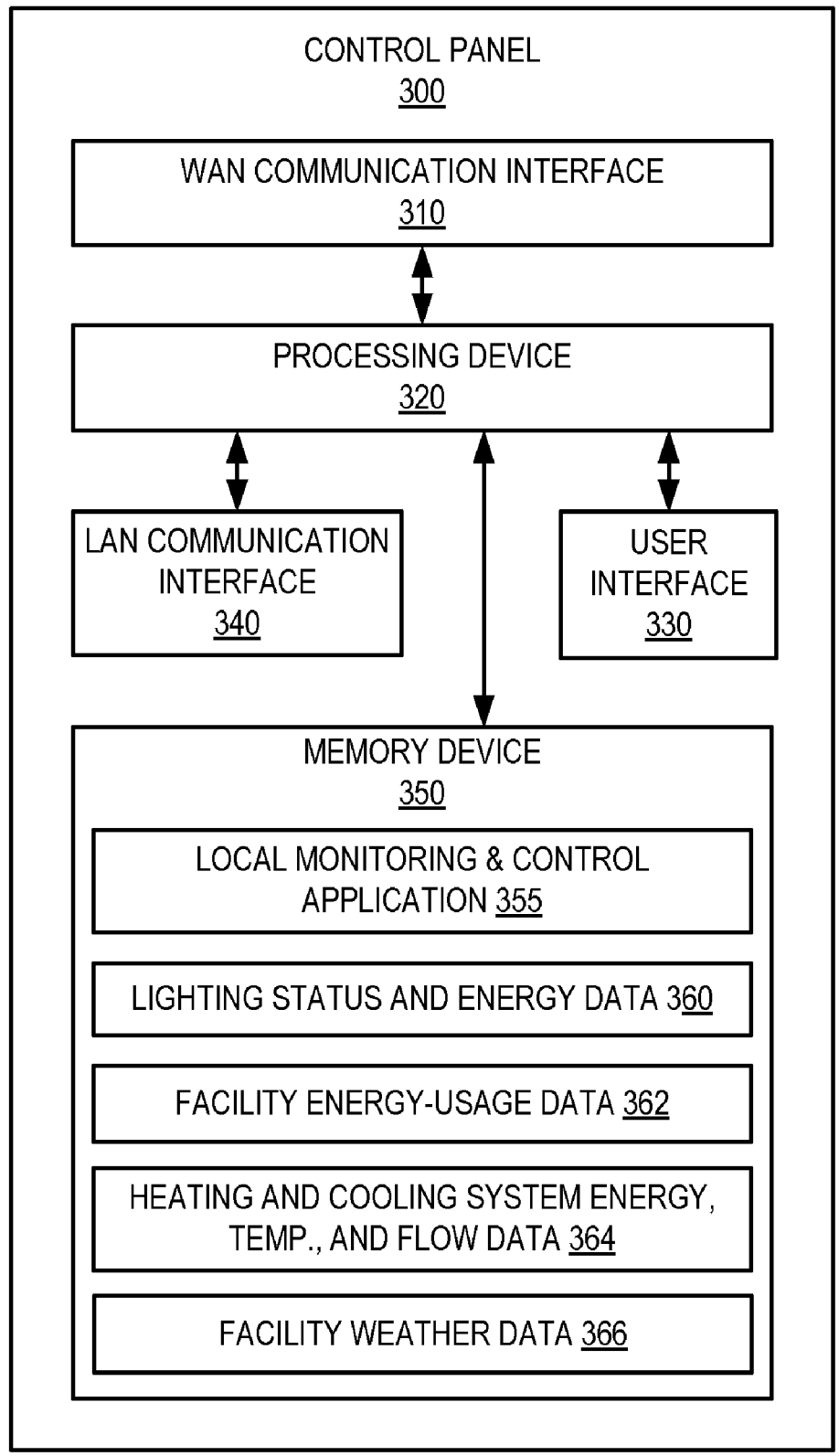
Figure 5:
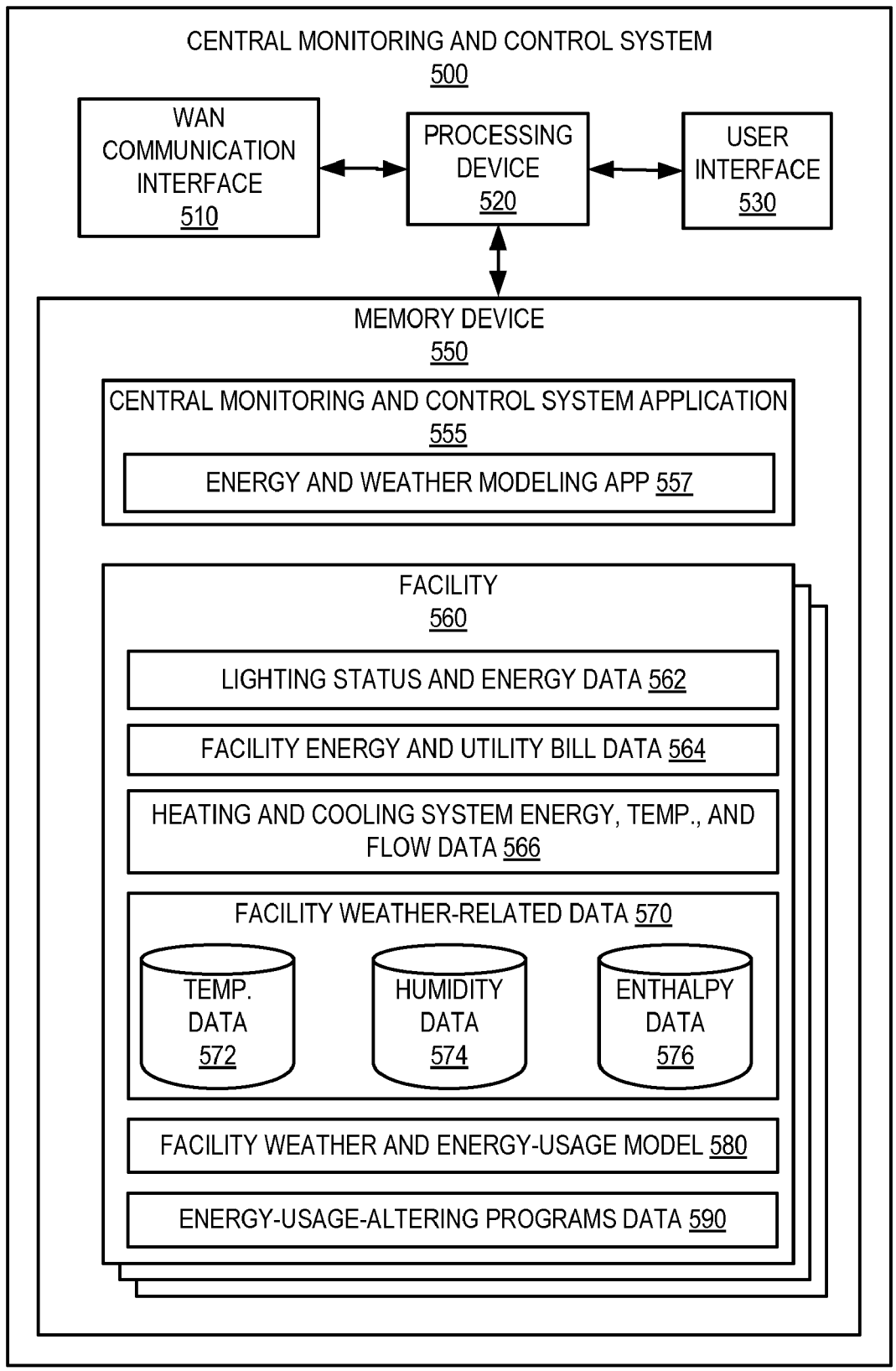
Figure 6:
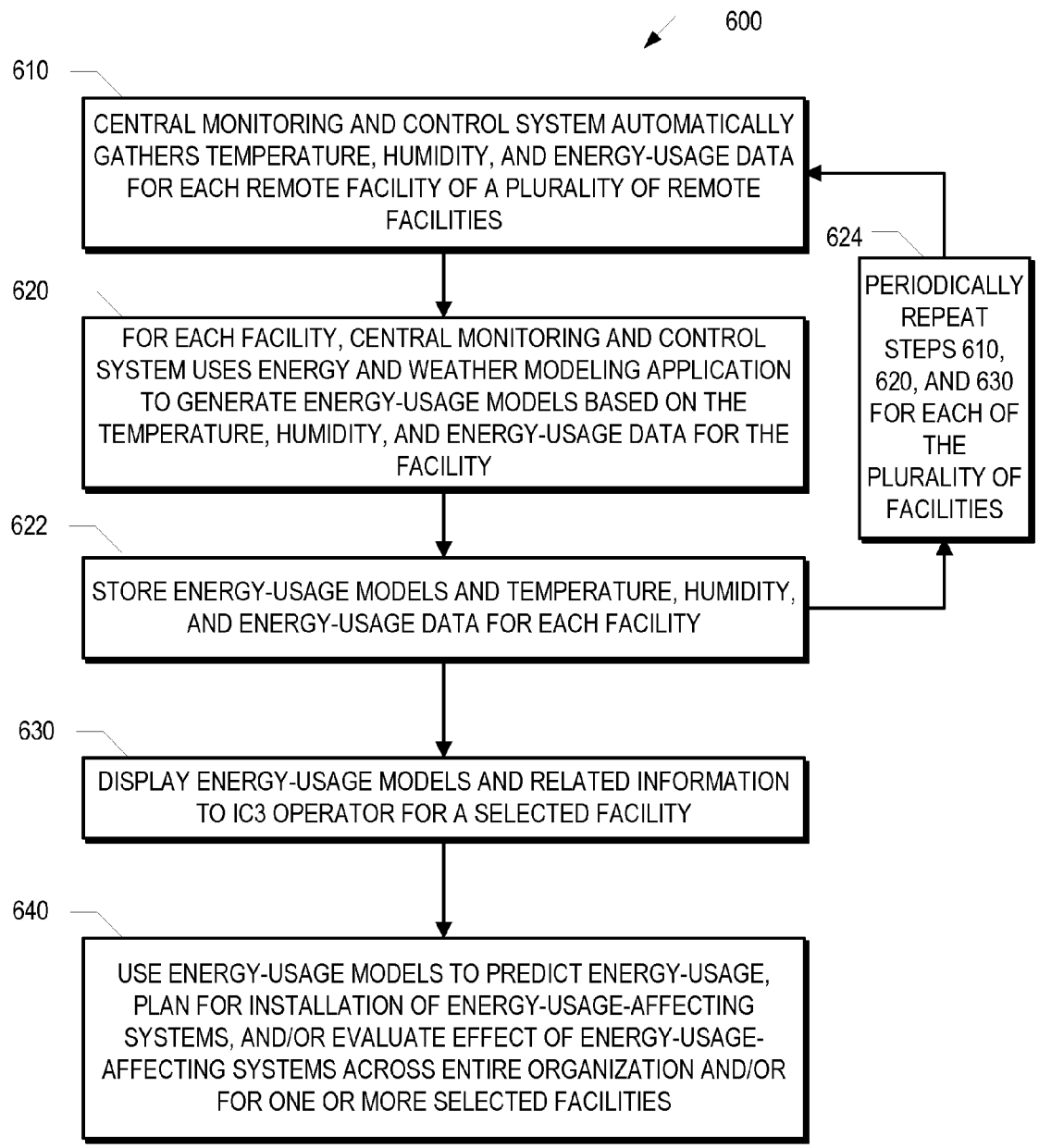
Figure 7:
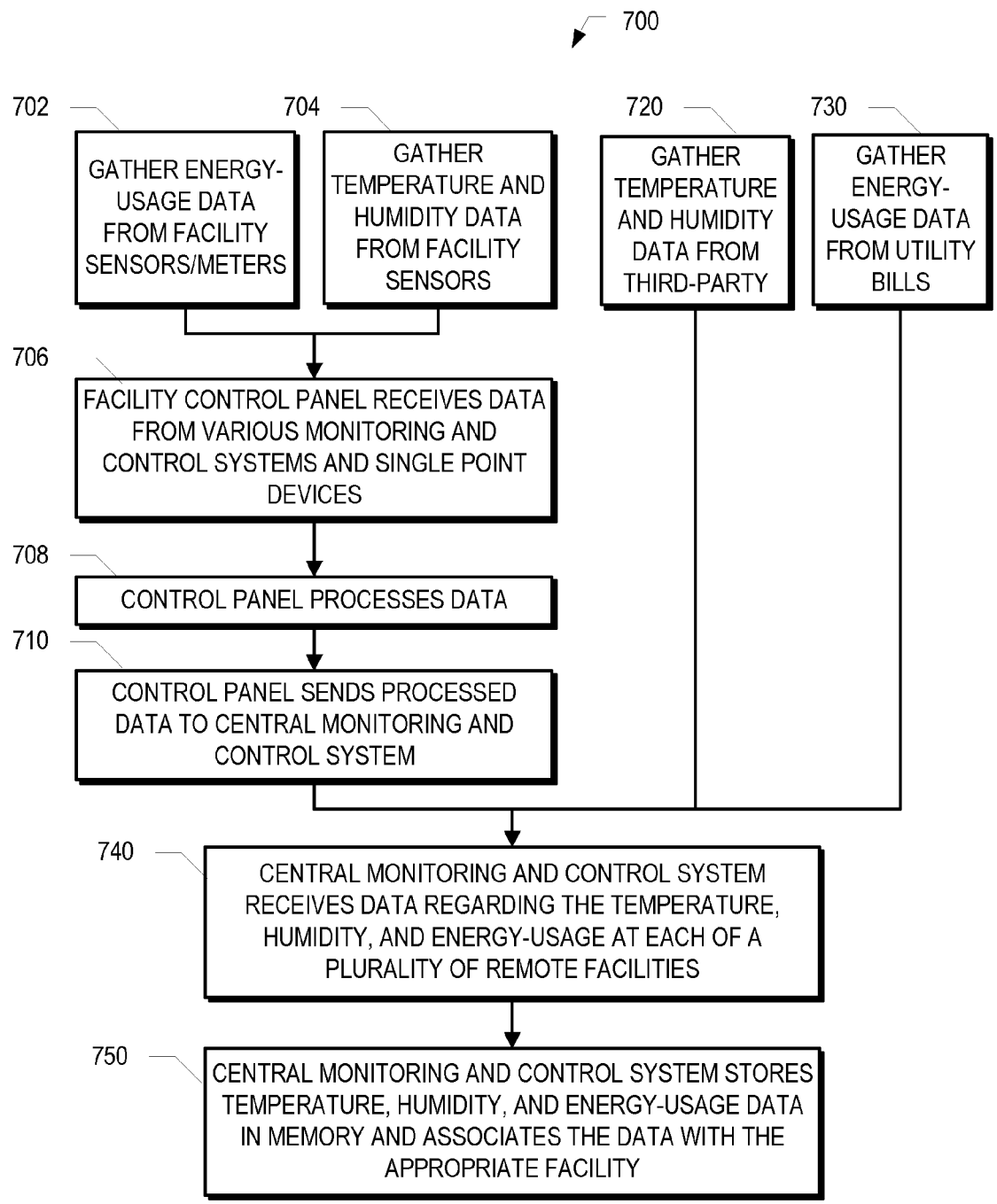
Figure 8:
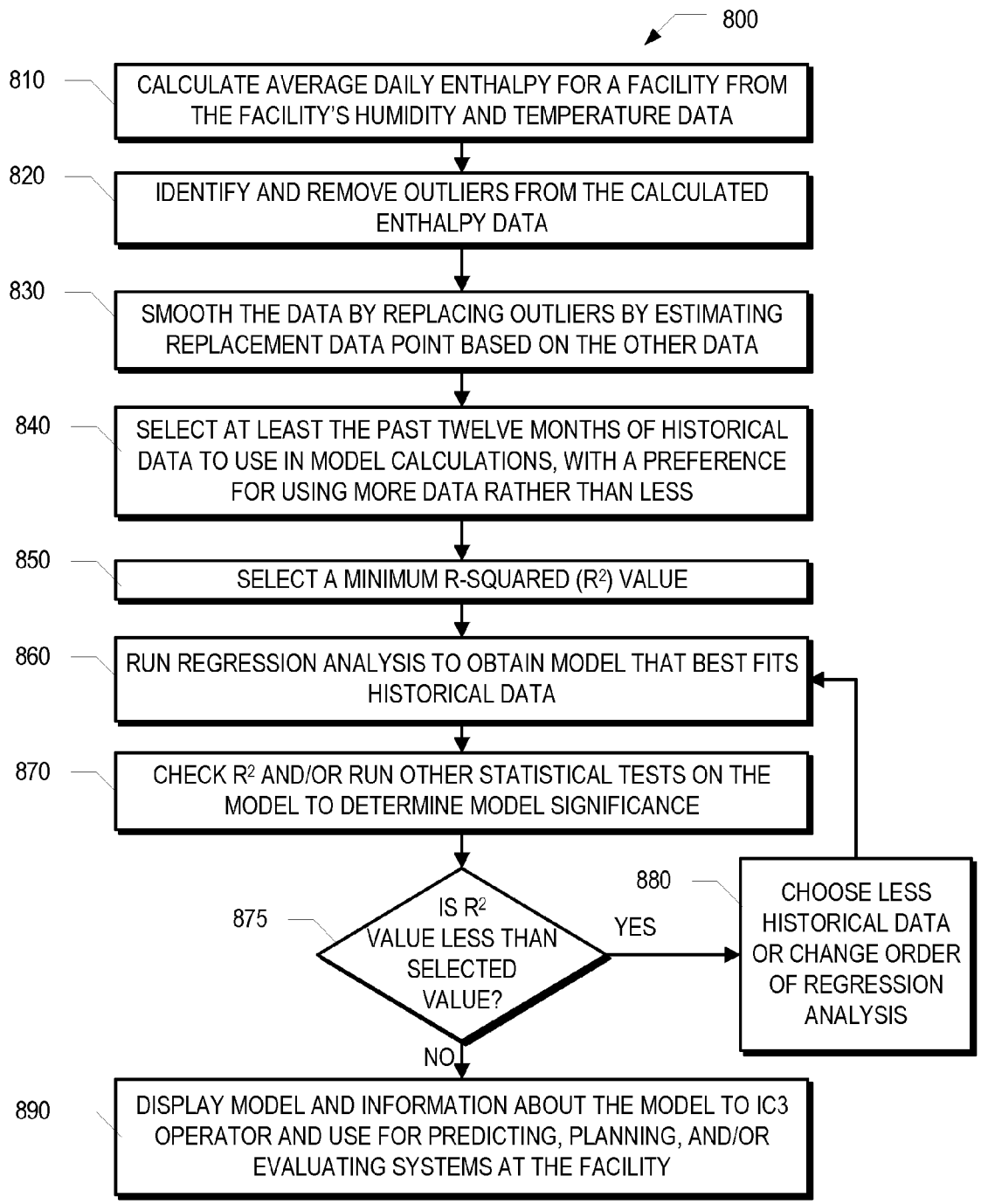
Figure 9:
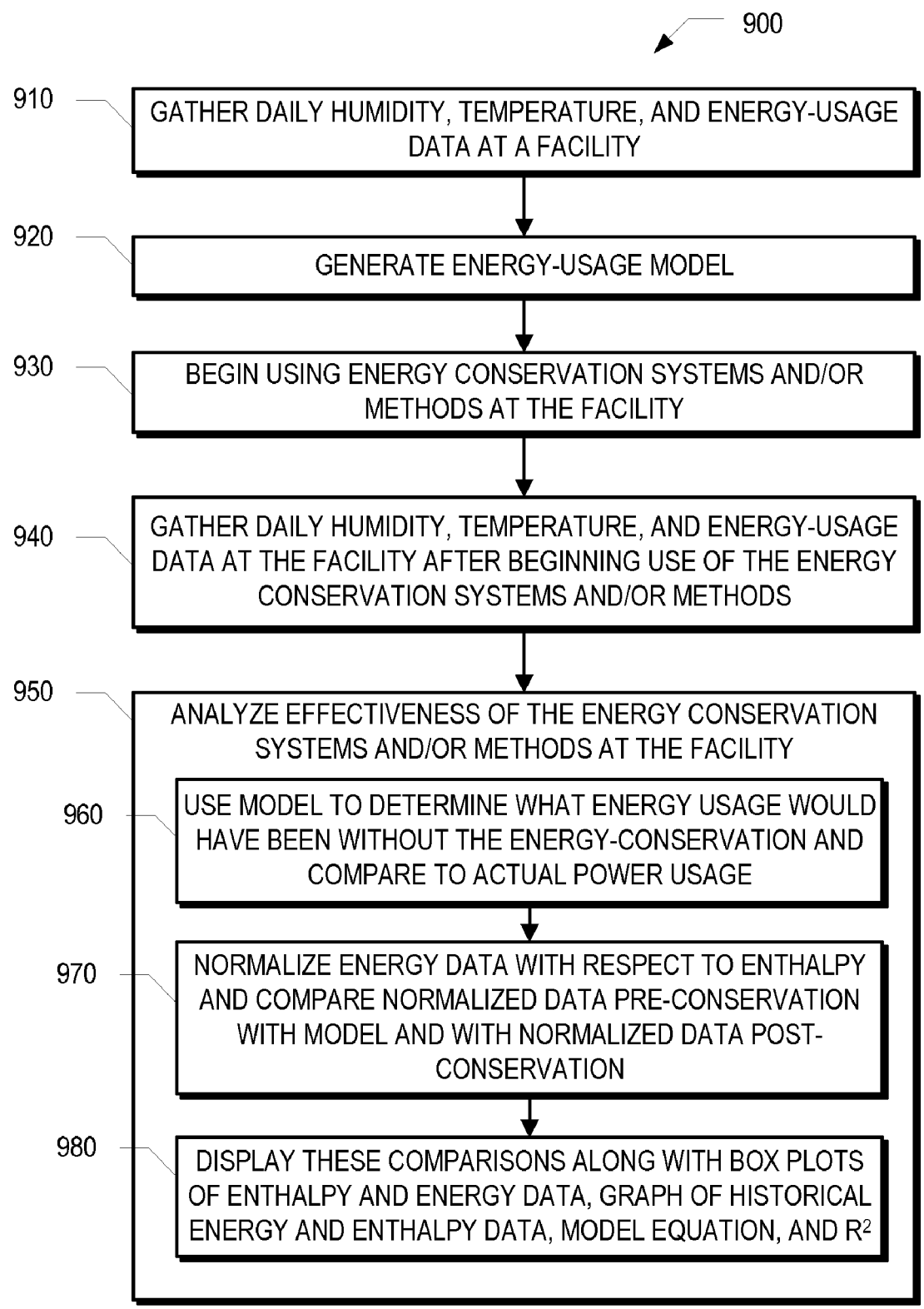
Figure 10:
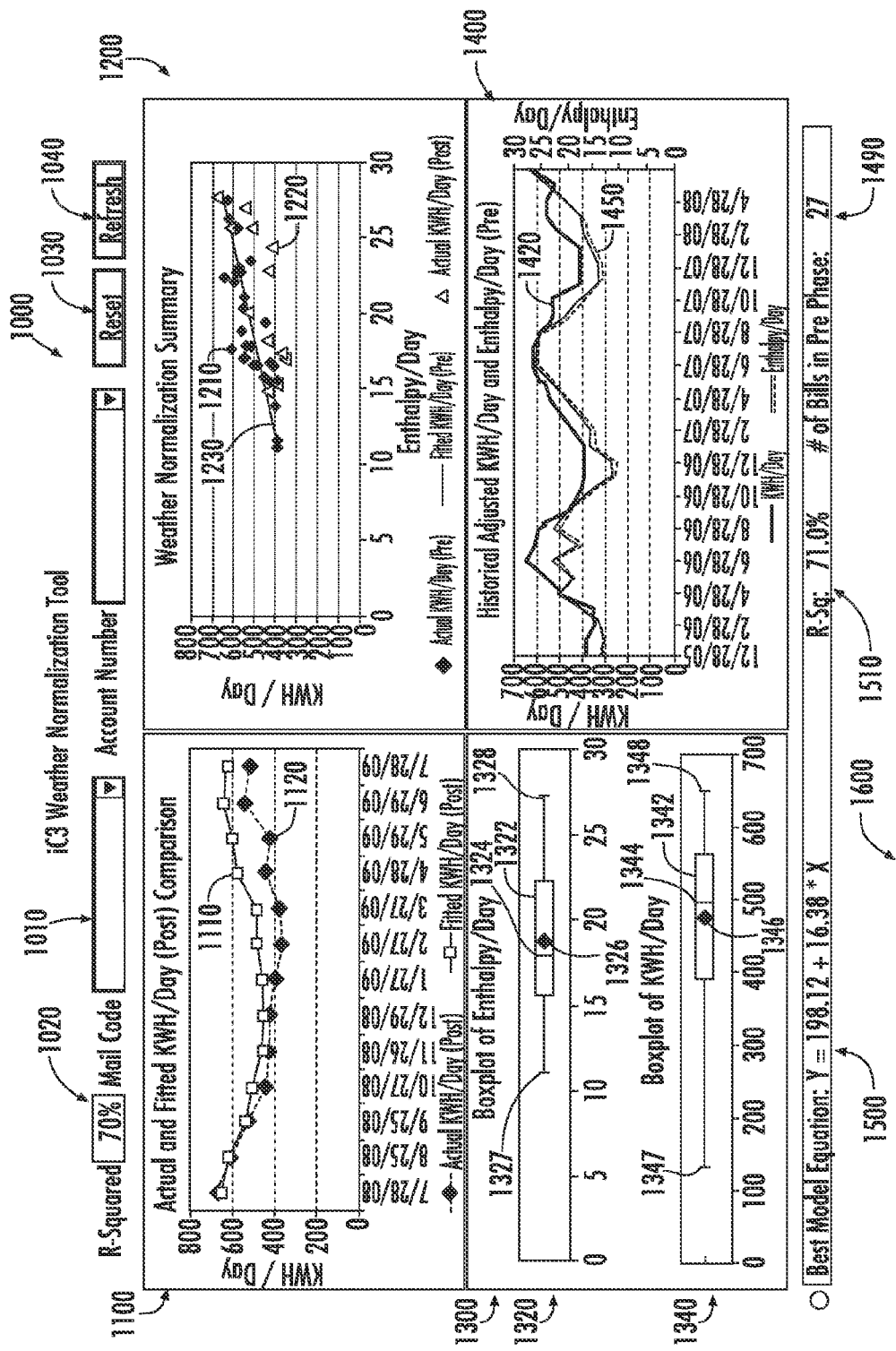

Having thus described embodiments of the invention in general terms, reference will now be made to the accompanying drawings, wherein:

FIG. 1 provides a block diagram illustrating an energy maintenance and management system, in accordance with an embodiment of the present invention;

FIG. 2 provides a block diagram illustrating a local monitoring and control system, in accordance with an embodiment of the present invention;

FIG. 3 provides a block diagram illustrating a control panel, in accordance with an embodiment of the present invention;

FIG. 4 provides a block diagram illustrating a weather monitoring and control system, in accordance with an embodiment of the present invention;

FIG. 5 provides a block diagram illustrating a central monitoring and control system, in accordance with an embodiment of the present invention;

FIG. 6 provides a flow chart illustrating a process for assessing energy-using systems and methods for an organization made up of a plurality of remote facilities, in accordance with an embodiment of the present invention;

FIG. 7 provides a flow chart illustrating processes of gathering weather and energy data for each of a plurality of remote facilities, in accordance with an embodiment of the present invention;

FIG. 8 provides a flow chart illustrating a process of modeling a facility's energy-usage data, in accordance with an embodiment of the present invention;

FIG. 9 provides a flow chart illustrating a process of assessing an energy conservation program for a particular facility, in accordance with an exemplary embodiment of the invention; and FIG. 10 provides a screen shot illustrating an example of charts, data, and comparisons displayed by the central monitoring and control system, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an energy maintenance and management system 1 in accordance with an embodiment of the present invention. As illustrated in FIG. 1, the energy maintenance and management system 1 includes an intelligent command and control center (IC3) 4 where an organization can monitor and manage energy-using systems and, in some cases, other happenings (e.g., weather) at a plurality of the organization's remote facilities, such as the remote facilities 6, 7 and 8 illustrated in FIG. 1. For example, in one embodiment of the invention, the organization is a bank having tens of thousands of bank branches around the world. In some such embodiments of the invention, the IC3 4 allows the bank to control the lighting, HVAC systems, boilers, chillers, and/or other energy-using systems at all of its branches at one remote central command and control center. In some such embodiments, the IC3 4 can also remotely monitor certain conditions at the facility, such as occupancy, people flow, temperature, humidity, ambient light, weather, energy usage, and/or the like. In some such embodiments, the IC3 4 can turn the various energy-using systems on and off based on the conditions monitored at each branch and, in some cases, the IC3 4 is configured to automatically do so in a way that provides a comfortable environment for the bank's employees and customers while at the same time increasing the efficiency of the various energy-using systems. In some embodiments of the invention, the IC3 4 can also use the data that it gathers from the branches to recognize, diagnose, troubleshoot, fix, and/or create work orders for problems at the branches. Furthermore, as described hereinbelow, embodiments of the IC3 can also be used to model energy usage at each facility as a function of the facility's weather and these models can be used to assess energy usage at the facility and energy-usage-altering systems and methods at the facility. It should be understood that, although some example embodiments of the invention are described herein as being used in bank facilities, other embodiments of the invention can work equally well in other applications. For example, embodiments of the invention could be used for restaurant organizations, building management organizations, retail store organizations, governmental organizations, and/or other business or non-business organizations.

In the embodiment of the invention illustrated in FIG. 1, the IC3 4 includes a central monitoring and control system 500 and one or more IC3 operators 12. The central monitoring and control system 500 is described in greater detail hereinbelow with reference to FIG. 5. Each of the remote facilities, such as remote facility 6, includes a local monitoring and control system 200, one or more energy-using systems 22, and, in some cases, one or more facility operators 24. The local monitoring and control system 200 is described in greater detail hereinbelow with reference to FIGS. 2-4. The central monitoring and control system 500 is communicably coupled to each remote facility's local monitoring and control system 200 via a network, such as a wide area network (WAN) 2. The WAN 2 may provide for wireline, wireless, or a combination of wireline and wireless communication between devices in the network. In this way, the WAN 2 allows for the communication of information between the central monitoring and control system 500 and each local monitoring and control system 200. In one embodiment, the WAN 2 includes the Internet.

In general, a facility's local monitoring and control system 200 is configured to monitor the workings of the facility's power-using systems 22 and/or other facility happenings. The local monitoring and control system 200 then gathers and processes the monitored data and communicates certain data to the central monitoring and control system 500 at the IC3 4. The central monitoring and control system 500 and/or the IC3 operators 12 can then use this data to identify problems at the facility 6, identify inefficiencies at the facility 6, record events at the facility 6, troubleshoot problems at the facility 6, instruct facility operators 24 to perform certain tasks, control systems at the facility 6, and/or the like. In one embodiment, the IC3 operators 12 include technicians skilled in the areas of the different facility power systems 22, such as HVAC technicians, electrical technicians, lighting technicians, systems engineers, and/or the like.

In some embodiments, the central monitoring and control system 500 is configured to communicate with one or more third-party data providers 9 over the WAN 2. For example, as described in greater detail hereinbelow, in one embodiment of the invention the third-party data provider 9 includes a server providing weather-related information for a given location, and the central monitoring and control system 500 receives weather data from the third-party data provider 9. In another example embodiment of the invention, the third-party data provider 9 is an energy provider and the central monitoring and control system 500 receives invoices or other information from the third-party data provider 9 that shows energy usage for each of one or more of the remote facilities.

Referring now to FIG. 2, an illustration is provided of a local monitoring and control system 200, in accordance with an embodiment of the present invention. As illustrated in FIG. 2, the local monitoring and control system 200 includes a control panel 300 communicably coupled to systems configured to monitor and/or control the electrical systems located at the facility 6 and/or other happenings at the facility 6. In the illustrated embodiment of the invention, these monitoring and/or control systems include, but are not limited to: (1) a lighting monitoring and control system 210 configured to monitor and/or control the facility's lighting systems; (2) a facility electricity meter 220 configured to monitor the facility's total energy usage; (3) a heating and cooling monitoring and control system 230 configured to monitor and/or control the facility's heating and cooling systems, such as its HVAC systems; and (4) a weather monitoring system 400 configured to monitor the facility's weather, such as the temperature and relative humidity outside the facility 6. The control panel 300 communicates data, commands, electrical signals, and/or the like with these monitoring and control systems via a network, such as a local area network (LAN) 250. The LAN 250 may provide for wireline, wireless, or a combination of wireline and wireless communication between the devices in the network. In one embodiment, the LAN 250 includes a wired/wireless communication network, including such devices as wired/wireless modems, routers, etc., that communicably couple the control panel 300 with one or more of the facility's other devices. In some embodiments, the LAN 250 also includes an electrical network that electrically couples the control panel 300 with one or more of the facility's other devices and one or more of the facility's electrical power circuits. In one embodiment, the LAN 250 is operated by the organization and serves only the local facility 6.

FIG. 3 provides a block diagram illustrating the control panel 300 in greater detail, in accordance with an embodiment of the present invention. As illustrated in FIG. 3, in one embodiment of the invention, the control panel 300 includes a processing device 320 operatively coupled to a WAN communication interface 310, a LAN communication interface 340, a memory device 350, and, in some cases, a user interface 330.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. For example, in one embodiment of the control panel 300, the memory device 350 includes a local monitoring and control application 355 having computer-executable program code that instructs the processing device 320 to operate the WAN communication interface 310, the LAN communication interface 340, and the user interface 330 to perform certain communication functions of the control panel 300 described herein. The computer-executable program code of the local monitoring and control application 355 may also instruct the processing device 320 to perform certain logic, data processing, and data storing functions of the control panel 300 described herein.

It will be appreciated that, although a single processing device may be illustrated in the figures and referred to in the descriptions of each of these figures, each processing device referred to herein may, in fact, be made up of many different processing devices coupled together or existing separate and apart from each other. For example, in some embodiments of the invention, one single processing device performs each of the different functions attributed to it herein. In other embodiments, each of the different functions may be handled by different processing devices that are, in fact, physically separate, but conceptually, may be thought of as a single processing device.

As used herein, a "communication interface" generally includes a modem, server, transceiver, and/or other device for communicating with other devices on a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users. As used herein, a "memory device" generally refers to a device or combination of devices including one or more forms of computer-readable media for storing instructions, computer-executable code, and/or data thereon. Computer-readable media is defined in greater detail hereinbelow. It will be appreciated that, as with the processing device, each communication interface and memory device may be made up of a device or many separate devices that conceptually may be thought of as a single device.

Referring again to FIG. 3, the WAN communication interface 310 is a communication interface having one or more communication devices configured to communicate with one or more other devices on the WAN 2, including the central monitoring and control system 900. The processing device 320 is configured to use the WAN communication interface 310 to transmit and/or receive data and/or commands to and/or from the central monitoring and control system 500.

The LAN communication interface 340 includes a communication interface having one or more communication devices configured to communicate data and/or electrical signals to and/or from one or more other devices on the LAN 250, including the various monitoring and control systems described herein. The processing device 320 is configured to use the LAN communication interface 340 to communicate data, commands, electrical signals, and/or the like to and/or from these other systems or devices.

The processing device 320 is configured to use the LAN communication interface 340 to gather data from the various monitoring systems. The processing device 320 then temporarily stores the data in the memory device 350 before sending the data or some modified portion of the data to the central monitoring and control system 500 using the WAN communication interface 310. In this regard, in one embodiment of the invention, the memory device 350 includes datastores of, for example: (1) lighting system status and energy data 355; (2) facility energy-usage data 362 (e.g., kilowatt-hours of electricity per day); (3) heating and cooling system energy, temperature, and/or flow data 364; and (4) facility weather data 366 (e.g., temperature, relative humidity, and/or the like). The lighting system status and energy data 355 may include data about whether one or more of the lighting systems in the facility 6 are on or off, the energy drawn by the one or more different lighting systems or other energy-related data (e.g., electrical resistance data, electrical current data, kWh, etc.), when any automatic lighting schedules are overridden by someone in the facility 6, and/or the like. The facility energy-usage data 362 may include data from the facility's electricity meter showing total electricity usage (e.g., kWh, kWh/day, etc.). The heating and cooling system data 364 may include, for example, temperature data and/or flow data taken from different locations within or outside of these systems, energy-usage or other energy-related data, system status data (e.g., on/off), system override data, and/or the like. The facility weather data 366 may include, for example, temperature at one or more locations outside the facility (e.g., dry bulb temperature or wet bulb temperature), relative humidity at one or more locations outside of the facility, precipitation status and amounts, wind speed, wind direction, ambient light levels or other sun-intensity or cloud-cover data, and/or the like.

In some embodiments of the invention, the processing device 320 performs some processing of the data according to instructions specified in the local monitoring and control application 355. For example, in one embodiment, the processing device 320 "buckets" the data to reduce the amount and size of the data sent to the central monitoring and control system 500. For example, the control panel 300 may periodically receive temperature readings from a temperature sensor portion of the weather monitoring system 400 and "bucket" this data by only storing actual temperature changes and the length of time between each temperature change. In this way, the amount of data sent to the central monitoring and control system 500 can be significantly reduced relative to a system where each and every temperature reading is sent to the central monitoring and control system 500. This can be especially important in a system where there are thousands of remote facilities constantly sending data to the central monitoring and control system 500. In some embodiments, the processing device 320 may further process the data by converting, encrypting, summarizing, compressing, validating, and/or scrubbing the data prior to sending the data, or portions thereof, to the central monitoring and control system 900.

In addition to gathering, processing, and communicating data from the local facility 6 to the central monitoring and control system 500, the control panel 300 is further configured to receive commands or other information from the central monitoring and control system 500 and either relay these commands to the appropriate system control devices or take other appropriate action to control the systems in the facility 6 or to alert the appropriate facility operators 24.

In one embodiment of the invention, the control panel 300 is mounted in or near an electrical storage room containing the electrical equipment for the facility 6, since, in some embodiments, the control panel 300 connects to one or more electrical circuits related to the LAN 250, lighting systems, heating and cooling systems, and/or the like. In one embodiment, a network cable or wireless network modem is connected to the control panel 300 during installation in order to allow the control panel 300 to communicate with the central monitoring and control system 500 over the WAN 2. In one embodiment, a second network cable or wireless network modem is connected to the control panel 300 during installation in order to allow the control panel 300 to communicate with the various facility control and monitoring systems over the communication portion of the LAN 250.

As further illustrated in FIG. 3, in some embodiments of the invention, the control panel 300 includes a user interface 330. For example, in one embodiment, the user interface 330 includes one or more indicator LEDs or other lights for alerting facility operators 12 or other on-site technicians of potential problems or of the status of the system or any system component, network connection, and/or the like. The user interface 330 may also include, in some embodiments, a monitor and keyboard, touch screen, one or more data ports for downloading data or troubleshooting codes, a buzzer or speaker for sounding alarms, and/or the like.

Referring now to FIG. 4, a block diagram is provided illustrating a weather monitoring system 400, in accordance with an embodiment of the present invention.

As illustrated, in one embodiment of the invention, the weather monitoring system 400 can include but is not limited to, one or more: (1) outside air temperature sensors 410; (2) outside air humidity sensors 420; and/or (3) other weather sensing devices 430, such as wind sensors, precipitations sensors, sunlight sensors, barometers, pressure sensors, and/or the like. In one embodiment of the invention, each of these sensors are equipped with a LAN communication interface for communicating data to the control panel 300 via the LAN 250, and, ultimately, to the central monitoring and control system 500 via the WAN 2. In some cases, the LAN communication interface is also used to receive commands from the control panel 300.

In order to obtain accurate outside temperatures, in one embodiment, the outside air temperature sensor 410 is mounted on the rooftop HVAC unit, on the north side of the building facing away from direct sunlight and a suitable distance from any mechanically induced heat. It will be understood that such an installation location is ideal for many buildings in the United States. However, where the energy maintenance and management system 1 is implemented in other areas around the globe, the ideal position of the outside air temperature sensor 410 may be different. In some instances, when the outside air temperature sensor 410 is being installed in a facility attached to or within another organization's facility and where roof access is limited, the outside air temperature sensor 410 can be located outside of the mechanical room wall or other facility wall. The outside air temperature sensor 410 and the outside air humidity sensor 420, as well as any other weather sensors 430, may be either wirelessly connected to or hardwired to the control panel 300.

FIG. 5 provides a block diagram illustrating a central monitoring and control system 500, in accordance with an embodiment of the present invention. As illustrated in FIG. 5, the central monitoring and control system 500 generally includes a WAN communication interface 510, a processing device 520, a user interface 530, and a memory device 550. The processing device 520 is operatively coupled to the WAN communication interface 510, the user interface 530, and the memory device 550. In one embodiment of the central monitoring and control system 500, the memory device 550 includes a central monitoring and control application 555 having computer-executable program code that instructs the processing device 520 to operate the WAN communication interface 510 and the user interface 530 to perform certain communication functions of the central monitoring and control system 500 described herein. The computer-executable program code of the central monitoring and control application 555 may also instruct the processing device 520 to perform certain logic, data processing, and data storing functions of the central monitoring and control system 500 described herein.

The WAN communication interface 510 is a communication interface having one or more communication devices configured to communicate with one or more other devices on the WAN 2, including the control panel 300 of each local monitoring and control system 200 at each remote facility. The processing device 520 is configured to use the communication interface 510 to receive information from and/or provide information and commands to a control panel 300 at each remote facility via the WAN 2. In some embodiments, the processing device 520 also uses the WAN communication interface 510 to access other devices on the WAN 2, such as one or more web servers of one or more third-party data providers 9. In some embodiments, one or more web servers may be used to obtain information from third parties that may be useful for assessing and controlling the performance of facility systems, such as weather information at each facility from one or more weather service providers, sunrise and sunset information for each facility, contractor information for local contractors near each facility, energy use data from one or more utilities, and/or the like.

As described above, the processing device 520 is configured to use the WAN communication interface 510 to gather data from the various local monitoring and control systems 500. The processing device 520 stores the data that it receives in the memory device 550. In this regard, in one embodiment of the invention, for each remote facility having a local monitoring and control system 500, the memory device 550 includes datastores of, for example: (1) lighting system status and energy data 562; (2) facility energy-usage and/or utility bill data 564; (3) heating and cooling system energy, temperature, and/or flow data 566; (4) facility weather data 570, including, for example, temperature data 572, humidity data 574, and/or enthalpy data 576; (5) facility weather and energy-usage models 580 generated from the data (as described hereinbelow); and/or (6) schedule data and/or other facility-specific control rules 590.

The lighting system status and power data 562 may include data about whether one or more of the lighting systems in the facility are on or off, the power drawn by the one or more different lighting systems or other power-related data such as electrical resistance data, when any automatic lighting schedules are overridden by someone in the facility, and/or the like. The facility energy and/or utility bill data 564 generally includes data about the facility's energy usage, such as, for example, total electricity data used per day or per some other period as sensed from an electricity meter located at the facility or as determined from one or more utility bills for the facility. The heating and cooling system data 566 may include, for example, temperature data and/or flow data taken from different locations within or outside of these systems, energy-usage data or energy-related data for each unit or component thereof, system status data (e.g., on/off), system override data, and/or the like. The weather data 570 may include information about the weather received from the local monitoring and control systems 200 or deduced from such data, or, in some embodiments, includes information about the facility's weather received from some other source, such as from a third-party web server. In some embodiments, the weather data 570 includes outside air temperature data 572, humidity data 574, and enthalpy data 576. As described hereinbelow, in some embodiments of the invention the central monitoring and control system 500 calculates enthalpy data 576 from the temperature 572 and humidity data 574. The facility weather and energy usage model data 580 includes information, such as equations and other information about the models generated as described hereinbelow. The energy-usage-altering program data 590 includes information about any energy-usage-altering programs, such as energy conservation programs or new energy-using systems or methods, that may be proposed for or implemented at the facility. For example, in one embodiment, the central monitoring and control system 500 is configured to monitor and control many of the energy-using systems at the facility and the data 590 includes a schedules and rules for operating these energy-using systems automatically in a way that should reduce the facility's total energy usage. The data 590 may also include the date that such a program went into effect at the facility, if already implemented at the facility.

As further illustrated in FIG. 5, in some embodiments of the invention, the central monitoring and control system 500 includes a user interface 530. In general, the user interface 530 includes one or more display devices, keyboards, touch screens, buzzers, lights, LEDs, speakers, microphones, and/or other user input and output devices that are used by the central monitoring and control system 500 to display data to and receive commands from the IC3 operators 12. In this regard, the central monitoring and control system application 555 includes computer executable program code for generating and displaying, via the user interface 530, a graphical user interface that displays information received from the remote facilities to the IC3 operators 12 in an interactive way and allows the IC3 operators 12 the ability to send commands to the remote facilities, create system schedules for each remote facility, and view information about each facility and the facility's power-using systems. The central monitoring and control system application 555 also includes computer executable program code for generating and displaying, via the user interface 530, a graphical user interface that displays information about each facility's energy-usage as a function of the facility's weather as well as information about an energy-usage model generated for each facility, such as the graphical user interface illustrated in FIG. 10.

In one exemplary embodiment, the user interface 530 includes a plurality of workstations for a plurality of IC3 operators 12, each workstation including a monitor, keyboard, mouse, and headset with microphone and speaker. In one embodiment, the user interface 530 further includes several large display screens that are used to display high-level system-wide information to the IC3 operators 12 and/or that an IC3 operator 12 can use to display what is on his or her workstation monitor to the rest of the IC3 operators 12. FIG. 10, described in greater detail hereinbelow, provides an example of a graphical user interface generated by the central monitoring and control system 500 in accordance with an embodiment of the present invention.

FIG. 6 provides a flow chart 600 illustrating a process for assessing energy-using systems and methods for an organization made up of a plurality of remote facilities, in accordance with an embodiment of the present invention. As represented by block 610, the central monitoring and control system 500 gathers temperature, humidity, and energy-usage data for each of the plurality of remote facilities. As represented by block 620, for each facility, the central monitoring and control system 500 uses the energy and weather modeling application 557 stored in its memory device 550 to generate an energy-usage model for the facility based on the temperature, humidity, and energy-usage data for the facility. As represented by block 622, the central monitoring and control system 500 then stores the energy-usage models and the temperature, humidity, and energy-usage data for each of the plurality of facilities. As represented by block 624, the central monitoring and control system 500 periodically repeats steps 610, 620, and 630 for each of the plurality of facilities so that the stored data is kept substantially up-to-date and a history is generated for each of the organization's many remote facilities.

The automatic and continuous gathering of energy/weather data and calculating of weather-dependant energy-usage models for each remote facility of the organization, allows the organization to easily access energy-usage data and assess energy usage and energy conservation programs across the organization as a whole as well as across certain selected facilities or groups of facilities. For example, as represented by block 630, the central monitoring and control system 500 can display the energy-usage model and related information for any selected facility to the IC3 operator 12. As represented by block 640, the IC3 operator 12 and/or the central monitoring and control system 500 can also use the energy-usage model to predict energy usage, plan for implementation of energy-usage-altering programs, and/or evaluate the effects of energy-usage-altering programs across the entire organization or at any selected facility or group of facilities.

Each of the steps of the flow chart 600 is described in greater detail hereinbelow with reference to FIGS. 7-10. It will be appreciated that, in some embodiments of the invention, the central monitoring and control system 500 is conceptually one system but is, in fact, made up of numerous separate and distinct computing devices. As such, it will be appreciated that, in some embodiments of the invention, each of the steps of the flow chart 600 or other flow charts described herein may be performed on different computing devices. For example, in some embodiments of the invention, the weather and energy data may be gathered by a first computing device and the weather- and energy-related data analytics may be performed by another computing device separate and distinct from the first computing device.

FIG. 7 provides a flow chart illustrating a processes 700 of gathering weather and energy data for each of a plurality of remote facilities, in accordance with an embodiment of the present invention. In one embodiment of the invention, the central monitoring and control system 500 gathers some or all of the weather data and energy-usage data directly from sensors located at one or more remote facilities. For example, as represented by block 702, in some such embodiments, a facility electricity meter 220 at each facility tracks the electricity used by each facility and communicates it via the facility's LAN 250 to the control panel 300. In some embodiments, the facility electricity meter 220 tracks electricity-usage over a predefined period of time, such as per hour or per day. In other embodiments, the facility electricity meter 220 tracks the rate at which electricity is used or total usage and the control panel 300 or central monitoring and control system 500 uses this data to determine electricity used per a pre-defined time period, such as hour, day, week, month, etc. In some embodiments, current sensors or other energy sensors are used at the facility to gather energy-usage data for individual energy-using systems at the facility.

As represented by block 704, in some embodiments of the invention, the weather data gathered by the system includes temperature data and humidity data gathered from sensors located in the outside air outside of each facility. For example, in one embodiment, one or more exterior temperature sensors 410 and humidity sensors 420 of each facility's weather monitoring system 400 sense temperature and relative humidity of the outside air at each facility, either constantly or periodically, and communicates this data over the facility's LAN 250 to the control panel 300.

As represented by block 706, the control panel 300 installed at each facility receives the energy-usage, temperature, and humidity data from the various meters and/or sensors installed at the facility. As represented by block 708, in some embodiments, the control panel 300 then performs any data processing that it may do on certain data prior to communicating the data to the central monitoring and control system 500. For example, in some embodiments of the invention, the control panel 300 buckets certain data, as described hereinabove, or averages the data over pre-defined time intervals so as to reduce the amount of data communicated to the central monitoring and control system 500. In other embodiments, processing may include compressing, encrypting, or otherwise modifying the data for transmission. In still other embodiments, the control panel 300 may combine data (e.g., add up energy use data for a plurality of components of a particular system so as to provide the central monitoring and control system 500 with total energy usage data for the system as a whole, or subtract facility power use by HVAC power use to provide non-HVAC facility power use, etc.) or otherwise manipulate or selectively send data to the central monitoring and control system 500. In still other embodiments, the control panel 300 merely relays data to the central monitoring and control system 500 without any processing of the data.

As illustrated by block 710, the control panel 300 sends the processed data to the central monitoring and control system 500 via, for example, the Internet or other WAN 2. As represented by block 740, the central monitoring and control system 500 receives the energy-usage, temperature, and humidity data from the control panel 300 as well as data from numerous other control panels associated with numerous other remote facilities. As represented by block 750, the central monitoring and control system 500 then stores this data for each facility in its memory device 550 and associates the data in the memory with the appropriate facility.

As FIG. 7 also illustrates, in some embodiments of the invention, the central monitoring and control system 500 gathers the weather data and/or the energy-usage data from one or more other sources. For example, as illustrated by block 720, in one embodiment of the invention, the central monitoring and control system 500 contacts a third-party data provider 9, such as a weather service, via the WAN 2 and obtains temperature and humidity data for each remote facility location. In one embodiment of the invention, the central monitoring and control system 500 accomplishes this by communicating a geocode or other address information to the third-party data provider 9 and, based thereon, the third-party data provider 9 replies with, for example, daily average temperature, humidity, enthalpy, and/or other weather data. As illustrated by block 730, in some embodiments of the invention, the central monitoring and control system 500 obtains energy-usage data, such as daily energy usage, from utility bills received for the remote facilities. In another embodiment, the central monitoring and control system 500 communicates, via the WAN 2, with a third-party data provider 9, such as a web server of the utility that provides energy to the remote facility, and obtains energy-usage data therefrom.

FIG. 8 provides a flow chart illustrating a process 800 of modeling a facility's energy-usage data, in accordance with an embodiment of the present invention. As represented by block 810, the central monitoring and control system 500 calculates the average daily enthalpy, or other enthalpy data 576, for a facility from the facility's humidity data 574 and temperature data 572. For example, in one embodiment, the central monitoring and control system 500 calculates the average daily temperature and humidity of the outside air at the facility from the temperature data 572 and humidity data 574. The central monitoring and control system 500 then either uses a known algorithm for calculating enthalpy based on relative humidity and dry-bulb temperature of air, or uses a psychrometric chart to look-up the enthalpy based on the dry-bulb temperature and relative humidity. It will be appreciated that, although embodiments of the invention are generally described herein as calculating and/or using average daily data, other embodiments of the invention may calculate and/or use average monthly data, average weekly data, average hourly data, daily high data, daily low data, and/or other time periods and statistical representations of the data during each time period.

As represented by block 820, in some embodiments of the invention, the central monitoring and control system 500 identifies and removes outliers from the calculated enthalpy data. For example, in some embodiments of the invention, the central monitoring and control system 500 and/or the IC3 operators 12 use box plots, standard deviation techniques, and/or other statistical techniques to identity and remove outlying enthalpy data. Similarly, outlying temperature, humidity, and/or energy data may be removed since the sensors or other gathering techniques may make errors from time to time and/or other environment factors or rare occurrences could throw off the model.

As represented by block 830, in some embodiments of the invention, the central monitoring and control system 500 may then smooth the data by replacing outliers with estimated data. For example, in one embodiment of the invention, the central monitoring and control system 500 looks at the non-outlier data surrounding the outlying data point and averages the values to determine a replacement data point. In other embodiments of the invention, outliers are merely removed and are not replaced.

As represented by block 840, in some embodiments of the invention, the central monitoring and control system 500 selects at least the past twelve months of historical data to use in model calculations, with a preference for using more data rather than less. For example, in one embodiment of the invention, the central monitoring and control system 500 selects all available data up to some pre-defined maximum amount of data or going back to some known change in the energy-usage systems of the particular facility. A twelve month minimum amount of data is generally preferred since the model should be based on at least a complete year to capture the changes in seasons at the facility. However, in some embodiments of the invention, the minimum amount of time that must be used to calculate the model is longer or shorter than twelve months.

As represented by block 850, the central monitoring and control system 500 determines a minimum R-squared ($R^2$) value that the model must have to be considered valid. For example, in one embodiment of the invention, an IC3 operator 12 enters a minimum $R^2$ value that the central monitoring and control system 500 should use for the particular facility or for all facilities. As is known in the art, $R^2$ is a statistical measure of how well a regression line approximates real data points. $R^2$ values can range from 0% (i.e., 0.0) to 100% (i.e., 1.0). The higher the $R^2$ value, the better the fit. As such, $R^2$ can be a good indicator of how "good" a particular model is.

As represented by block 860, the central monitoring and control system 500 then runs a regression analysis to obtain a model that best fits the selected historical data. For example, in one embodiment, the central monitoring and control system 500 performs a first order linear regression to obtain an equation for daily energy-usage as a function of average daily enthalpy that best fits the historical data.

As represented by block 870, in some embodiments of the invention, the central monitoring and control system 500 calculates $R^2$ for the generated model and/or runs other statistical tests on the model to determine model significance. In an embodiment where $R^2$ is calculated for the model, the central monitoring and control system 500 compares the calculated $R^2$ value with the minimum $R^2$ determined in step 850 described above to determine if the model is acceptable, as represented by block 875. Embodiments of the invention that perform other statistical checks on the model may also factor in these tests in determining if the model is good enough for purposes of this invention.

If the calculated $R^2$ value is less than the pre-defined minimum value, then the model is not acceptable. In such cases, as represented by block 880, the central monitoring and control system 500 may then choose less historical data or change the order of regression analysis and generate a new model. For example, in some instances, a facility may have undergone certain energy-usage-affecting changes, such as major facility additions, system overhauls, system updates, and/or energy-conservation programs, in the past that significantly impacted energy-usage. These types of changes often negatively impact the ability to generate a good model of energy-usage at the facility if the data used to generate the model spans this change. As such, in one embodiment, if a first model is generated using the two most recent years of data and the change occurred at the facility a year and half ago, the central monitoring and control system 500 may automatically take increasingly smaller time periods into account until a good model is generated. In some embodiments, in addition to or as an alternative to taking smaller amounts of historical data, the central monitoring and control system 500 may automatically change the order of the regression. For example, the system 500 may first try a first order regression and then try a second order regression, or vice versa, if the first model did not satisfy the $R^2$ requirement or other statistical tests.

As represented by block 890, if and when the model is validated by the $R^2$ requirement and/or other statistical tests, then the central monitoring and control system 500 displays the model and information about the model to IC3 operator 12 and/or uses the model to predict energy usage and/or plan for and/or evaluate energy-usage-altering programs at the facility. For example, FIG. 9 illustrates a process 900 of assessing an energy conservation program for a particular facility, in accordance with an exemplary embodiment of the invention. FIG. 10 illustrates a graphical user interface used to display the model and information about a model, energy-usage, and the effects of an energy conservation program at a particular facility, in accordance with and embodiment of the present invention.

More particularly, referring to FIG. 9, as represented by block 910 and as described hereinabove, in some embodiments of the invention, the central monitoring and control system 500 gathers daily humidity, temperature, and energy-usage data for a facility. As represented by block 920 and as also described hereinabove, the central monitoring and control system 500 then generates an energy-usage model from the gathered data.

As represented by block 930, in some embodiments of the invention, the central monitoring and control system 500 begins using energy conservation systems and/or methods at the facility. For example, in one embodiment of the invention, the central monitoring and control system 500 begins to control the facility's energy-using systems, such as the lights and HVAC systems, automatically in order to reduce energy usage at the facility. In other embodiments of the invention, new higher-efficiency energy-suing systems or methods may be instituted at the facility.

As represented by block 940, the central monitoring and control system 500 then continues to gather daily humidity, temperature, and energy-usage data at the facility after beginning to use of the energy conservation systems and/or methods.

As represented by block 950, the central monitoring and control system 500 then analyzes the effectiveness of the energy conservation systems and/or methods at the facility. For example, in one embodiment of the invention, this analysis includes, as represented by block 960, the central monitoring and control system 500 using the facility's energy-usage model generated as described hereinabove to determine what energy usage would have been at the facility without the energy-conservation and compare these values to actual power usage at the facility. For example, in one embodiment, the central monitoring and control system 500 uses the model equation of energy-usage as a function of enthalpy to calculate the approximate energy-usage that would have resulted from the enthalpy (i.e., the weather) experienced by the facility since the energy conservation system was installed had the energy conservation system not been installed. This calculated energy usage is then compared to the actual energy usage for the facility as gathered from facility sensors/meters or facility utility bills since the energy conservation system was installed. As represented by block 970, in some embodiments of the invention, the central monitoring and control system 500 normalizes energy data with respect to enthalpy and compares normalized data pre-conservation with the model itself and with normalized data post-conservation. As represented by block 980, in some embodiments of the invention, the central monitoring and control system 500 displays these comparisons along with box plots of the enthalpy and energy data, a graph of historical energy and enthalpy data used to generate the model, the model equation, and the $R^2$ value for the model.

In this regard, FIG. 10 provides a screen shot of an exemplary graphical user interface 1000 illustrating an example of the charts, data, and comparisons displayed by the central monitoring and control system 500, in accordance with embodiments of the invention described above. In one embodiment of the invention, the graphical user interface is displayed to an IC3 operator 12 using a display device of a user interface 530 of the central monitoring and control system 500.

As illustrated in FIG. 10, the graphical user interface (GUI) 1000 includes a facility selection tool 1010 having a drop down menu that allows an IC3 operator 12 to select a particular remote facility by, for example, the facility's mail code. The GUI 1000 also shows the minimum $R^2$ value 1020 used when generating the energy-usage model, which, in this example, is set at 70%. In one embodiment of the invention, the IC3 operator 12 can use the GUI 1000 to change this minimum $R^2$ value 1020. The GUI 1000 also shows the best model equation 1500 (here, e.g., y=16.38x+198.12, where y=energy usage in kWh/day, and x=enthalpy/day in Btu/lb dry air) of daily energy usage as a function of average daily enthalpy, where the equation is generated using the process described above in FIG. 8. The GUI 1000 also shows the actual $R^2$ value 1510 for the model equation 1500.

The GUI 1000 further includes a box plot portion 1300 having a box plot 1320 of the enthalpy data and a box plot 1340 of the energy-usage data. These box plots can be used to identify outlier data and/or to provide the IC3 operator 12 with an overview of the range of possible and probably enthalpy and energy-usage data for the particular facility. For example, the each box plot 1320/1340 includes a lower "whisker" 1327/1347 and an upper "whisker" 1328/1348 showing the lower and upper bounds of the observed data. Each box plot 1320/1340 also includes a box 1322/1342 that spans from the lower quartile of data to the upper quartile of data. Each box 1322/1342 includes a line 1324/1344 showing the median value and a diamond symbol 1326/1346 illustrating the mean value.

The GUI 1000 further includes a graph 1400 of the adjusted historical enthalpy and energy-usage data from before the energy conservation program was implemented at the facility ("pre"). This data has been adjusted as described above in FIG. 8 to remove any outliers and to smooth the data. The historical data shown in this graph 1400 shows the range of data that was used to generate the model equation 1500. The number 1490 shows the number of utility bills that, in this example, are covered by the historical data (here 27 bills) shown in the graph 1400.

The GUI 1000 also includes a graph 1100 comparing the actual and modeled daily energy-usage after implementation of the energy conservation program at the facility ("post"). In one embodiment, as also described above with reference to FIG. 9, the model equation is used to calculate the energy usage 1110 that would have resulted without the energy conservation program given the actual enthalpy data. This is compared with the actual energy-usage data 1120 over the same period since the energy conservation program was implemented at the facility. This graph 1100 shows how the energy conservation program has resulted in lower energy usage than what the estimated energy usage would have been based on the model equation (which is based on pre-conservation data) and the actual enthalpy data.

The GUI also includes a graph 1200 showing normalized energy-usage data, normalized by plotting energy usage data as a function of enthalpy data. This graph 1200 shows a scatter plot of the normalized actual data pre-conservation program 1210 and post-conservation program 1220 and compares these data points to a line 1230 representing the model equation 1500. This graph 1200 shows how the normalized post-conservation program data points 1220 are generally below, and in some cases, well below the pre-conservation model equation line 1230 indicating that the energy-usage at this facility was significantly improved by the energy conservation program.

In some embodiments, the GUI 1000 also includes a rest button 1030 to reset all of the data, and a refresh button 1040 to recalculate the data based on updated information that may have been received by the central monitoring and control system 500 or modified user inputs.

As will be appreciated by one of skill in the art, the present invention, as described hereinabove and in FIGS. 1-10, may be embodied as a method (e.g., a computer-implemented process, a business process, or any other process), apparatus (including a device, machine, system, computer program product, and/or any other apparatus), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable computer readable medium may be utilized. The computer readable medium may be, for example but not limited to, an electronic, magnetic, optical, electromagnetic, infrared, or semiconductor system, apparatus, device, or medium. More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code. The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

The following co-pending U.S. patent applications are hereby incorporated by reference: U.S. patent application Ser. No. 12/617,217 to Johnson et al. and entitled "Facility Maintenance and Management System"; U.S. patent application Ser. No. 12/617,220 to Johnson et al. and entitled "Power Using Device Monitor"; U.S. patent application Ser. No. 12/617,224 to Johnson et al. and entitled "Site Survey and Installation for Remote Facility Management System"; and U.S. patent application Ser. No. 12/617,228 to Johnson et al. and entitled "Facility Monitoring and Control System Interface."

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible. Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously. Those skilled in the art will also appreciate, in view of this disclosure, that different embodiments of the invention described herein may be combined to form other embodiments of the invention.

What is claimed is:

1. An apparatus comprising:
 a memory comprising:
  enthalpy data, wherein the enthalpy data comprises data about a facility's enthalpy during each of a plurality of time periods;
  energy usage data, wherein the energy-usage data comprises data about the facility's energy usage during each of the plurality of time periods; and
  at least one minimum R-squared value; and
 a processor in communication with the memory and configured to:

use the enthalpy data and the energy-usage data to generate a model equation of the facility's energy usage as a function of enthalpy of outside air at the facility;
calculate an actual R-squared value of the model equation; and
compare the actual R-squared value to the minimum R-squared value stored in the memory.

2. The apparatus of claim 1, further comprising:
a communication interface configured to receive temperature data and humidity data, wherein the temperature data comprises information about the facility's outside air temperature during each of the plurality of time periods, wherein the humidity data comprises information about the facility's outside air relative humidity during each of the plurality of time periods, and wherein the processor is further configured to determine the enthalpy data based on the temperature data and humidity data and store the enthalpy data in the memory.

3. The apparatus of claim 2, wherein the communication interface is configured to receive the temperature data and humidity data from one or more sensors located at the facility.

4. The apparatus of claim 1, further comprising:
a communication interface configured to receive the energy-usage data from one or more electricity sensors or meters located at the facility.

5. The apparatus of claim 1, wherein the processor is further configured to:
identify and remove outlier enthalpy data or outlier energy-usage data prior to generating the model equation of the facility's energy usage.

6. The apparatus of claim 5, wherein the processor is configured to replace the outlier enthalpy data or outlier energy-usage data with estimated data based on non-outlier enthalpy or energy-usage data.

7. The apparatus of claim 1, wherein the plurality of time periods comprise a plurality of days, and wherein the enthalpy data comprises average enthalpy of the facility's outside air per day, and wherein the energy-usage data comprises energy-usage per day.

8. The apparatus of claim 1, wherein the processor is further configured to use the model equation to asses an energy-usage altering program or a proposed energy-usage-altering program at the facility.

9. The apparatus of claim 1, wherein the processor is configured to display a comparison of facility energy-usage data after an energy-usage-altering program is implemented at the facility with data generated from the model equation.

10. The apparatus of claim 1, wherein the memory comprises at least enthalpy data and energy usage data stored therein for a plurality of remote facilities, and wherein the processor is configured to use the enthalpy data and the energy-usage data to assess energy usage across one or more user-selected remote facilities.

11. The apparatus of claim 1, wherein the processor uses less enthalpy data and energy-usage data to generate the model equation if it determines that the model equation is less than the minimum R-squared value.

12. An apparatus comprising:
a memory comprising:
enthalpy data and energy usage data stored therein, wherein the enthalpy data comprises data about a facility's enthalpy during each of a plurality of time periods; and
energy usage data, wherein the energy-usage data comprises data about the facility's energy usage during each of the plurality of time periods; and
one or more rules; and
a processor in communication with the memory and configured to:
use the enthalpy data and the energy-usage data to generate a model equation of the facility's energy usage as a function of enthalpy of outside air at the facility;
generate a higher order model equation if it determines that the model equation does not satisfy the one or more rules stored in the memory, wherein the higher order model equation comprises another model equation with a higher power polynomial exponent than the model equation.

13. The apparatus of claim 12, further comprising:
a communication interface configured to receive temperature data and humidity data, wherein the temperature data comprises information about the facility's outside air temperature during each of the plurality of time periods, wherein the humidity data comprises information about the facility's outside air relative humidity during each of the plurality of time periods, and wherein the processor is further configured to determine the enthalpy data based on the temperature data and humidity data and store the enthalpy data in the memory.

14. The apparatus claim 12, wherein the one or more rules relate at least partially to a minimum R-squared value.

15. An apparatus comprising:
a memory comprising:
enthalpy data and energy usage data stored therein, wherein the enthalpy data comprises data about a facility's enthalpy during each of a plurality of time periods;
energy usage data, wherein the energy-usage data comprises data about the facility's energy usage during each of the plurality of time periods; and
one or more rules; and
a processor in communication with the memory and configured to:
use a first portion of the enthalpy data and the energy-usage data to generate a model equation of the facility's energy usage as a function of enthalpy of outside air at the facility; and
use a second portion of the enthalpy data and energy-usage data to generate the model equation when the processor determines that the model equation does not satisfy the one or more rules stored therein, wherein the second portion of the enthalpy data and the energy-usage data is less than the first portion.

16. The apparatus of claim 15, further comprising:
a communication interface configured to receive temperature data and humidity data, wherein the temperature data comprises information about the facility's outside air temperature during each of the plurality of time periods, wherein the humidity data comprises information about the facility's outside air relative humidity during each of the plurality of time periods, and wherein the processor is further configured to determine the enthalpy data based on the temperature data and humidity data and store the enthalpy data in the memory.

17. The apparatus of claim 15, wherein said processor further calculates an actual R-squared value of the model equation and compares the actual R-squared value to a minimum R-squared value, and wherein said processor uses less enthalpy data and energy-usage data to generate the model equation if it determines that the model equation is less than minimum R-squared value.

18. The apparatus of claim 15, wherein the one or more rules relate at least partially to a minimum R-squared value.

19. A method comprising:
gathering, using a computer, enthalpy data and energy-usage data, wherein the enthalpy data comprises data about a facility's enthalpy during each of a plurality of time periods, and wherein the energy-usage data comprises data about the facility's energy usage during each of the plurality of time periods; and
using the enthalpy data and the energy-usage data to generate, using a computer, a model equation of the facility's energy usage as a function of enthalpy of outside air at the facility;
calculating an actual R-squared value of the model equation; and
comparing the actual R-squared value to a minimum R-squared value.

20. The method of claim 19, further comprising:
receiving temperature data and humidity data, wherein the temperature data comprises information about the facility's outside air temperature during each of the plurality of time periods, and wherein the humidity data comprises information about the facility's outside air relative humidity during each of the plurality of time periods.

21. The method of claim 19, wherein said using the enthalpy data and the energy-usage data comprises using less enthalpy data and energy-usage data to generate the model equation if the model equation is less than minimum R-squared value.

22. A method comprising:
gathering, using a computer, enthalpy data and energy-usage data, wherein the enthalpy data comprises data about a facility's enthalpy during each of a plurality of time periods, and wherein the energy-usage data comprises data about the facility's energy usage during each of the plurality of time periods; and
using the enthalpy data and the energy-usage data to generate, using a computer, a model equation of the facility's energy usage as a function of enthalpy of outside air at the facility; and
generating a higher order model equation if it is determined that the model equation does not satisfy one or more rules, wherein the higher order model equation comprises another model equation with a higher power polynomial exponent than the model equation.

23. The method of claim 22, wherein the one or more rules relates at least partially to a minimum R-squared value.

24. The method of claim 22, further comprising:
receiving temperature data and humidity data, wherein the temperature data comprises information about the facility's outside air temperature during each of the plurality of time periods, and wherein the humidity data comprises information about the facility's outside air relative humidity during each of the plurality of time periods.

25. A method comprising:
gathering, using a computer, enthalpy data and energy-usage data, wherein the enthalpy data comprises data about a facility's enthalpy during each of a plurality of time periods, and wherein the energy-usage data comprises data about the facility's energy usage during each of the plurality of time periods; and
using a first portion of the enthalpy data and the energy-usage data to generate, using a computer, a model equation of the facility's energy usage as a function of enthalpy of outside air at the facility; and
using a second portion of the enthalpy data and energy-usage data to generate the model equation when the process determines that the model equation does not satisfy one or more rules, wherein the second portion of the enthalpy data and energy-usage data is less than the first portion.

26. The method of claim 25, wherein the one or more rules relate at least partially to a minimum R-squared value.

27. The method of claim 25, further comprising:
receiving temperature data and humidity data, wherein the temperature data comprises information about the facility's outside air temperature during each of the plurality of time periods, and wherein the humidity data comprises information about the facility's outside air relative humidity during each of the plurality of time periods.

28. The method of claim 25 further comprising:
calculating an actual R-squared value of the model equation; and
comparing the actual R-squared value to a minimum R-squared value, and
wherein said using the enthalpy data and the energy-usage data comprises using less enthalpy data and energy-usage data to generate the model equation if it determines that the model equation is less than minimum R-squared value.

29. A computer program product comprising a non-transitory computer readable medium, the non-transitory computer readable medium comprising computer-executable program code stored therein, the computer executable code comprising:
a first executable portion configured to obtain enthalpy data and energy-usage data, wherein the enthalpy data comprises data about a facility's enthalpy during each of a plurality of time periods, and wherein the energy-usage data comprises data about the facility's energy usage during each of the plurality of time periods;
a second executable portion configured to use the enthalpy data and the energy-usage data to generate, using a computer, a model equation of the facility's energy usage as a function of enthalpy of outside air at the facility;
a third executable portion configured to calculate an actual R-squared value of the model equation; and
a fourth executable portion configured to compare the actual R-squared value to a minimum R-squared value.

30. The computer program product of claim 29 further comprising:
a fifth executable portion configured to receive temperature data and humidity data, wherein the temperature data comprises information about the facility's outside air temperature during each of the plurality of time periods, and wherein the humidity data comprises information about the facility's outside air relative humidity during each of the plurality of time periods; and
a sixth executable code portion configured to determine the enthalpy data based on the temperature data and humidity data.

31. The computer program product of claim 30, wherein the second executable portion uses less enthalpy data and energy-usage data to generate the model equation if it is determine that the model equation is less than the minimum R-squared value.

32. A computer program product comprising a non-transitory computer readable medium, the non-transitory computer readable medium comprising computer-executable program code stored therein, the computer executable code comprising:
a first executable portion configured to obtain enthalpy data and energy-usage data, wherein the enthalpy data comprises data about a facility's enthalpy during each of a plurality of time periods, and wherein the energy-usage data comprises data about the facility's energy usage during each of the plurality of time periods;

a second executable portion configured to use the enthalpy data and the energy-usage data to generate, using a computer, a model equation of the facility's energy usage as a function of enthalpy of outside air at the facility;

a third executable portion configured to determine if the model equation satisfies the one or more rules stored in the memory device;

a fourth executable portion configured to generate a higher order model equation if it determines that the model equation does not satisfy one or more rules stored in the memory, wherein the higher order model equation comprises another model equation with a higher power polynomial exponent than the model equation.

33. The computer program product of claim 2, wherein the one or more rules relate at least partially to a minimum R-squared value.

34. The computer program product of claim 32 further comprising:

a fifth executable portion configured to receive temperature data and humidity data, wherein the temperature data comprises information about the facility's outside air temperature during each of the plurality of time periods, and wherein the humidity data comprises information about the facility's outside air relative humidity during each of the plurality of time periods; and a sixth executable code portion configured to determine the enthalpy data based on the temperature data and humidity data.

35. A computer program product comprising a non-transitory computer readable medium, the non-transitory computer readable medium comprising computer-executable program code stored therein, the computer executable code comprising:

a first executable portion configured to obtain enthalpy data and energy-usage data, wherein the enthalpy data comprises data about a facility's enthalpy during each of a plurality of time periods, and wherein the energy-usage data comprises data about the facility's energy usage during each of the plurality of time periods;

a second executable portion configured to use the enthalpy data and the energy-usage data to generate, using a computer, a model equation of the facility's energy usage as a function of enthalpy of outside air at the facility; and a third executable portion configured to use less enthalpy data and energy-usage data to generate the model equation if it determines that the model equation does not satisfy one or more rules.

36. The computer program product of claim 35, wherein the one or more rules relate at least partially to a minimum R-squared value.

37. The computer program product of claim 35 further comprising:

a fourth executable portion configured to receive temperature data and humidity data, wherein the temperature data comprises information about the facility's outside air temperature during each of the plurality of time periods, and wherein the humidity data comprises information about the facility's outside air relative humidity during each of the plurality of time periods; and a fifth executable code portion configured to determine the enthalpy data based on the temperature data and humidity data.

38. The computer program product of claim 35 further comprising:

fourth executable portion configured to calculate an actual R-squared value of the model equation; and fifth executable portion configured to compare the actual R-squared value to a minimum R-squared value, and wherein said processor uses less enthalpy data and energy-usage data to generate the model equation if it determines that the model equation is less than minimum R-squared value.

\* \* \* \* \*